Sept. 26, 1944.  R. O. ANDERSON  2,359,275
LOAD PICKUP DEVICE
Filed April 3, 1943  2 Sheets-Sheet 1
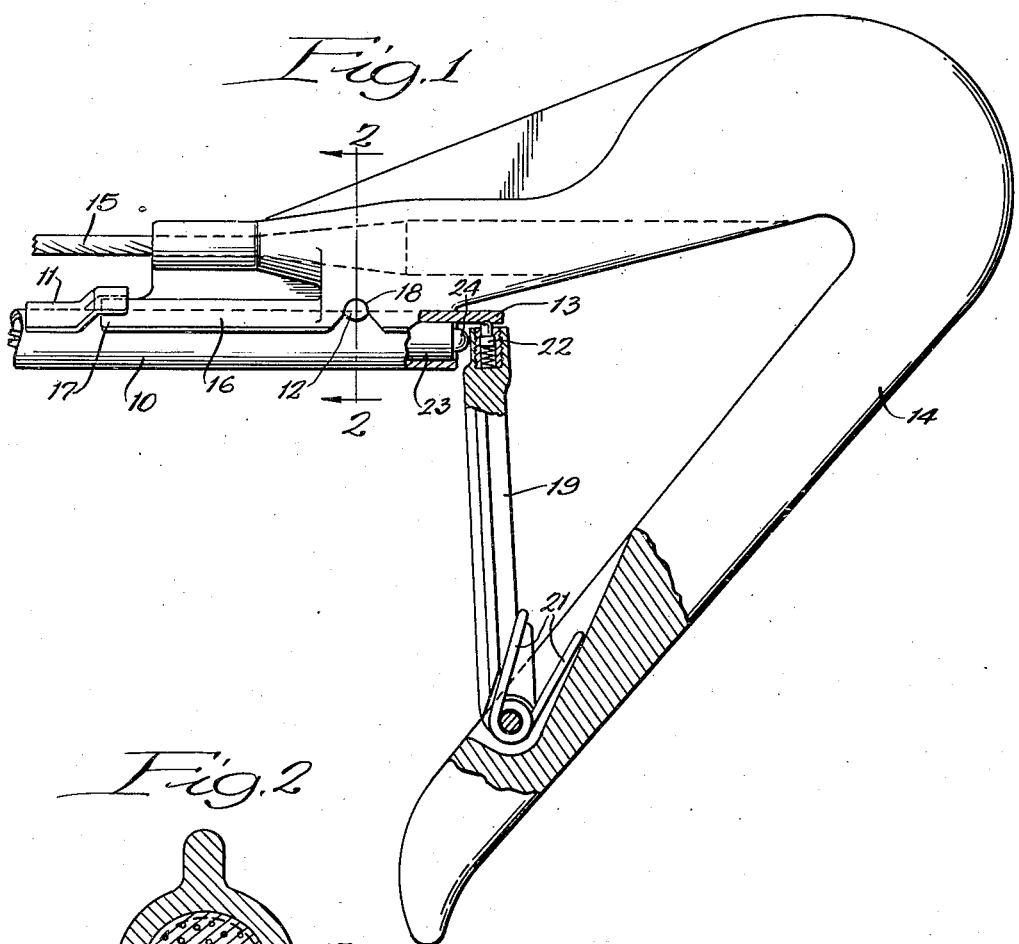
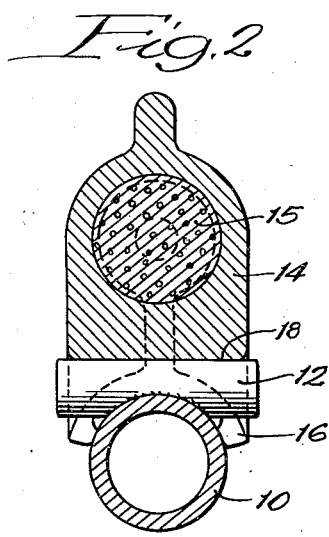
Inventor:
Rexford O. Anderson,
By Dawson, Ooms & Borth
Attorneys.

Sept. 26, 1944.   R. O. ANDERSON   2,359,275
LOAD PICKUP DEVICE
Filed April 3, 1943   2 Sheets—Sheet 2
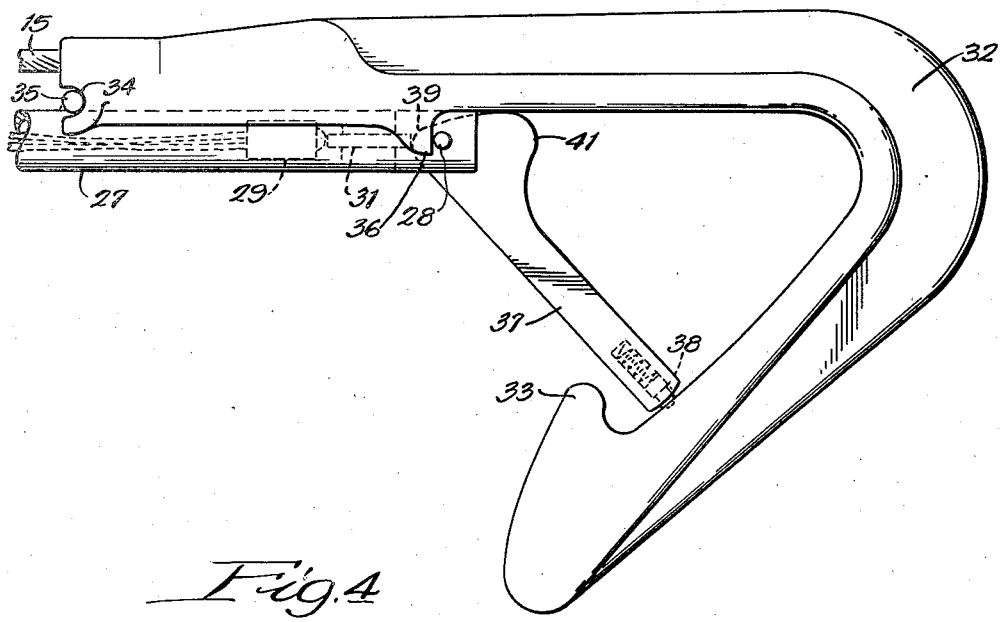
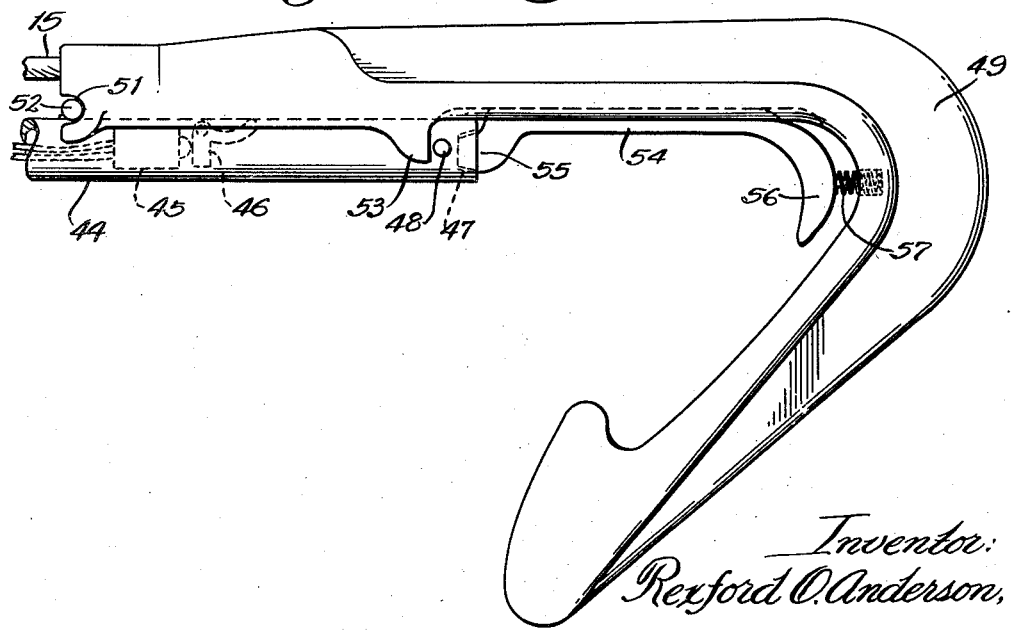
Inventor:
Rexford O. Anderson,
By Dawson, Ooms and Booth,
Attorneys.

Patented Sept. 26, 1944

2,359,275

UNITED STATES PATENT OFFICE 2,359,275

LOAD PICKUP DEVICE

Rexford O. Anderson, Chicago, Ill., assignor to Foote Bros. Gear and Machine Corporation, Chicago, Ill., a corporation of Delaware Application April 3, 1943, Serial No. 481,711

14 Claims. (Cl. 294—83)

This invention relates to load pickup devices and more particularly to a hook construction for connection with a cable or loop for aerial pickup purposes.

One of the objects of the invention is to provide a load pickup device in which a hook is detachably mounted on a support to be released therefrom on engagement with a load. According to one desirable construction, a latch is provided to hold the hook on the support and is engaged by a loop or the like connected to a load to release the hook.

Another object of the invention is to provide a load pickup device in which a hook is detachably latched to a support and is positively forced therefrom when the latch is moved to a released position.

Still another object of the invention is to provide a load pickup device in which release of the hook from the support operates a control device. In one construction the control device is operated by the latch which holds the hook on the support and in another by the hook itself.

The above and other objects and advantages of the invention will be more readily apparent from the following description when read in connection with the accompanying drawings, in which—

Figure 1 is a side elevation with parts in section of a hook mounted on a support;

Figure 2 is a section on the line 2—2 of Figure 1; and

Figures 3 and 4 are views similar to Figure 1 showing alternative construction.

In the construction as shown in Figures 1 and 2, a support 10 is provided in the form of a tube which may be carried by and extend from an aircraft. The support has on one side an offset piece 11 forming a groove facing in the direction of the end of the support. Adjacent its outer end the support carries a cross bar 12 welded or otherwise rigidly fastened thereto and at its outer end is formed with an extension 13 projecting beyond the end of the support.

A hook 14 is adapted to be connected to the support and has its shank connected to a cable 15 which may be carried by a reel in the airplane. The shank of the hook is formed with a grooved portion 16 to fit against the side of the hook and which terminates in a reduced extension 17 fitting under the offset piece 11. The grooved portion 16 is formed with a cross groove 18 to fit over the cross bar 12 so that longitudinal movement of the hook on the support will be prevented and the hook will be held against turning on the support.

The hook is prevented from swinging away from the support by a latch lever 19 pivoted at one end to the hook adjacent its point and urged to a closed position as shown by a spring 21. The free end of the lever 19 is adapted to engage the extension 13 and to be held releasably against the extension by a spring detent 22 fitting into a groove or depression in the extension. With the hook assembled on the support in this manner, it will be held rigidly in place until the lever is moved away from the extension 13 by engagement with a cable or other load connecting device. When this occurs, the hook may swing slightly counter-clockwise so that the groove 18 will release the cross bar 12 and the extension 17 will slip out from under the offset piece 11.

According to one feature of the invention, the support carries a control device 23 which may be an electric switch and which has an operating part 24 projecting beyond the end of the support. The part 24 is preferably urged out by a spring and engages the side of the lever 19 when the hook is assembled on the support to press the operating part in. When the lever is engaged by a cable and moved away from the extension 13, it releases the operating part 24 so that it may move outwardly and operate the switch 23. This switch may be used to control any desired device in the plane such, for example, as the accelerating motor more particularly described and claimed in the copending application of Ardussi, Anderson and Landry, Serial No. 483,078, filed April 14, 1943.

Figure 3 shows an alternative construction in which a support 27 has its ends split to carry a cross pivot rod 28. A control switch 29 is mounted in the support and is adapted to be operated by a plunger 31 slidably supported in the support and engaging an operating button on the end of the control switch.

A hook 32 is adapted to be mounted on the support and is formed adjacent its point with a barb 33 to prevent a cable from slipping out of the hook opening freely. At the end of its shank the hook is formed with a transverse groove 34 to fit over a cross pin 35 rigidly mounted on the support. The shank is further formed with a pair of lugs or ears 36 to overlie the opposite sides of the support and to engage the pivot pin 28 where it projects beyond the support. In this way, the hook is held against longitudinal movement on the support.

In this construction, a latching means is provided comprising a lever 37 pivoted on the pin 28 and adapted to engage the hook near its point as shown. Preferably, detent 38 is provided to hold the lever 37 in latching position. Adjacent the pivot the lever is formed with a cam portion 39 normally engaging the plunger 31 to operate the control switch 29 and with a second cam projection 41 normally lying adjacent the shank portion of the hook.

With the hook installed on the support as shown in Figure 3, the switch 29 will be held open and the latch lever 37 will prevent the hook from swinging away from the support. When the hook engages a cable the lever 37 will be swung counterclockwise moving the cam portion 39 away from the plunger 31 so that the switch 29 can close and at the same time the cam projection 41 will positively move the hook away from the support. This motion will release the ears 36 from the pivot rod 28 so that the hook may swing freely away from the support.

A still further embodiment of the invention is shown in Figure 4 including a support 44 carrying a control switch 45 and having pivoted therein an operating member 46 for the switch. The member 46, as shown, is in the shape of a bell crank having one arm engaging a projecting operating button on the switch 45 with its other arm projecting through the side of the support when the switch is in closed position. The outer end of the support is formed with a latch recess 47 and carries a cross pin 48.

A hook 49 is adapted to be mounted on the support and is formed with a cross groove 51 to fit over a rigid cross pin 52 on the support. The hook carries a pair of ears 53 overlying the opposite sides of the support and engaging the cross pin 48 to prevent longitudinal movement of the hook.

In order to latch the hook on the support a latch member 54 is slidably mounted on the shank portion of the hook and has a latch projection 55 extending into the recess 47 to hold the hook against swinging movement on the support. The latch member terminates adjacent the bottom of the hook in an operating part 56 lying across the opening of the hook in a position to be engaged by a cable or other load connecting device to which the hook is connected and which may be engaged by a spring 57 to urge the latch member to its latching position.

When the hook is assembled on the support as shown in Figure 4, the operating lever 46 will be rocked clockwise by engagement of the side of the hook with its upper arm to hold the switch 45 in open position. When the hook engages a cable loop or the like, the latch member 54 will be moved toward the bottom of the hook, moving the projection 55 out of the opening 47. When this occurs the hook is free to swing away from the support. At the same time, the operating lever 46 will move counter-clockwise under the influence of the spring pressed operating button on the switch so that the switch may close.

While several embodiments of the invention have been shown and described in detail, it will be understood that this is illustrative only and is not to be taken as definition of the scope of the invention, reference being had for this purpose to the appended claims.

What is claimed is:

1. A load pickup device comprising a support, a hook detachably mounted on the support, and means to hold the hook on the support including a latch member having a part lying in the opening of the hook to be engaged and released when the hook is connected to a load.

2. A load pickup device comprising a support member, a hook member detachably mounted on the support member, and a pivoted lever on one of the said members engaging the other to hold the hook on the support, the lever being adapted to be moved by engagement with a load to release the hook from the support.

3. A load pickup device comprising a support, a hook detachably mounted on the support, and a lever pivoted on the hook engaging the support to hold the hook on the support.

4. A load pickup device comprising a support, a hook detachably mounted on the support, and a lever pivoted on the support engaging the hook to hold the hook on the support.

5. A load pickup device comprising a support, a hook detachably mounted on the support, and a latch slidably mounted on the hook and engaging the support to hold the hook thereon, the latch having an extension lying in the opening of the hook.

6. A load pickup device comprising a support member, a hook member, means on the support forming a longitudinally facing groove, an extension on the shank of the hook fitting into the groove, with the shank of the hook lying against one side of the support, and a lever pivoted at one end to one of the members with its free end engaging the other.

7. A load pickup device comprising a support member, a hook member, means on the support forming a longitudinally facing groove, an extension on the shank of the hook fitting into the groove with the shank of the hook lying against one side of the support, a cross bar on said one side of the support, the shank of the hook having a groove therein to receive the cross bar, and a lever pivoted at one end to one of the members with its free end engaging the other.

8. A load pickup device comprising a support member, a hook member detachably mounted on the support, a latch movably carried by one of the members engaging the other and having a part normally lying in the opening of the hook to move the latch when the hook engages a load, and a cam extension on the latch to move the hook away from the support when the latch is moved.

9. A load pickup device comprising a support, a hook detachably mounted on the support, a latch lever pivoted on the support with its free end engaging the hook, and a cam extension on the lever to move the hook away from the support as the lever is turned on its pivot.

10. A load pickup device comprising a support, a control device carried by the support, a hook detachably mounted on the support, latch means for holding the hook on the support, and a projecting operating part on the control device engaged and urged to one position when the hook is mounted on the support and released to move to another position when the hook is detached from the support.

11. A load pickup device comprising a support, a control device carried by the support, a hook detachably mounted on the support, latch means for holding the hook on the support, and an operating part on the control device engaged by the latch means when it is in latching position.

12. A load pickup device comprising a support, a control device carried by the support, a hook detachably mounted on the support, latch means for holding the hook on the support, and an operating part for the control device projecting from the support to be engaged and moved by the hook when it is mounted on the support.

13. A load pickup device comprising a support, a control device on the support having a projecting operating part, a hook, interengaging parts on one side of the support and on the shank of the hook, and a pivoted lever on the hook adjacent its point engaging the support to hold the hook thereon and engaging the operating part to operate the control device.

14. A load pickup device comprising an elongated support, a control device carried by the support adjacent its end and having an operating part projecting beyond the end of the support, and extension on the support projecting beyond the end thereof, a hook, means on the shank of the hook engaging the support to limit movement therebetween, and a lever pivoted at one end on the hook adjacent its point, the free end of the keeper engaging the extension to hold the hook on the support and engaging the operating part to operate the control device.

REXFORD O. ANDERSON.